Oct. 3, 1933.    T. M. EYNON    1,928,620
GAUGE
Filed Dec. 31, 1931    2 Sheets-Sheet 2

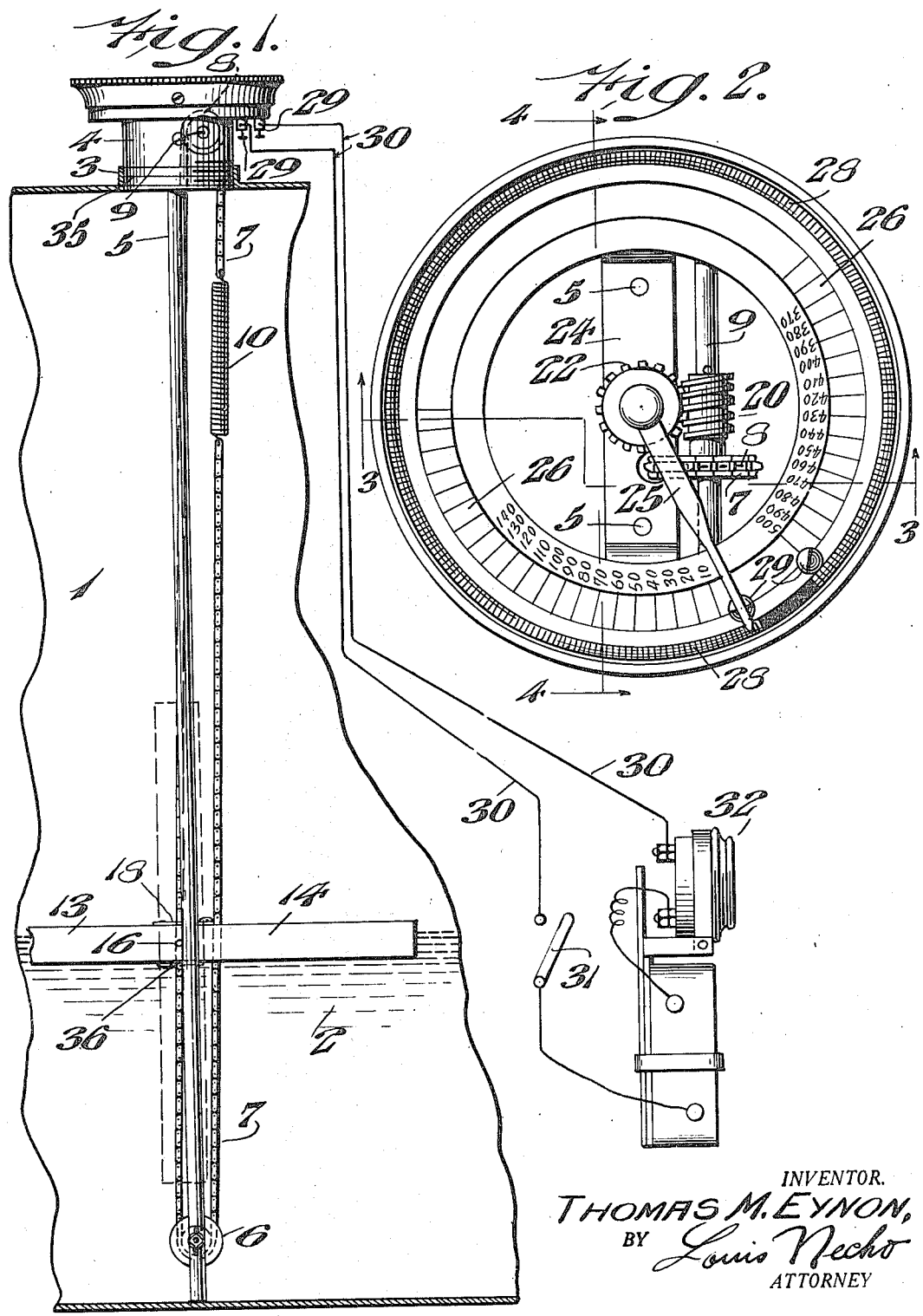

INVENTOR.
THOMAS M. EYNON,
BY Louis Necho
ATTORNEY

Patented Oct. 3, 1933

1,928,620

UNITED STATES PATENT OFFICE 1,928,620

GAUGE

Thomas M. Eynon, Philadelphia, Pa.

Application December 31, 1931
Serial No. 584,116

1 Claim. (Cl. 73—82)

My invention relates to a new and useful gauge whereby the amount of liquid in a tank or reservoir may be visually indicated at more than one point, either by a mechanical reading of indicating devices visible through the top of the tank or by measurement of electrical energy by means of a distant gauge, the amount of electrical energy indicated being representative of the amount of liquid in the tank or reservoir.

My invention further relates to a gauge of this character which is actuated by a float buoyed by the liquid in a tank, the tank being calibrated so that the height of the liquid therein might be translated into volumetric units.

To the above ends, my invention consists of a support adapted to be inserted through a relatively small opening in the top of the tank containing the liquid to be measured, sprockets at the top and bottom of said support, an endless chain traveling over said sprockets, a section of collapsible float carried by said chain, means for normally maintaining the sections of said float in a rigid, non-collapsible position, means for tensioning said chain, an indicator adapted to be actuated by the movement of said chain, a scale coacting with said indicator, a resistance element also coacting with said indicator, an electric circuit connected to said resistance element, and a gauge for indicating the amount of electrical energy passing through said resistance element.

My invention further relates to various other novel features of construction and advantage, all as hereinafter described and claimed in connection with the accompanying drawings, in which:

Figure 1 represents a view in elevation of my novel gauge shown applied to a tank.

Figure 2 is a plan view of Figure 1 on enlarged scale.

Figure 3:
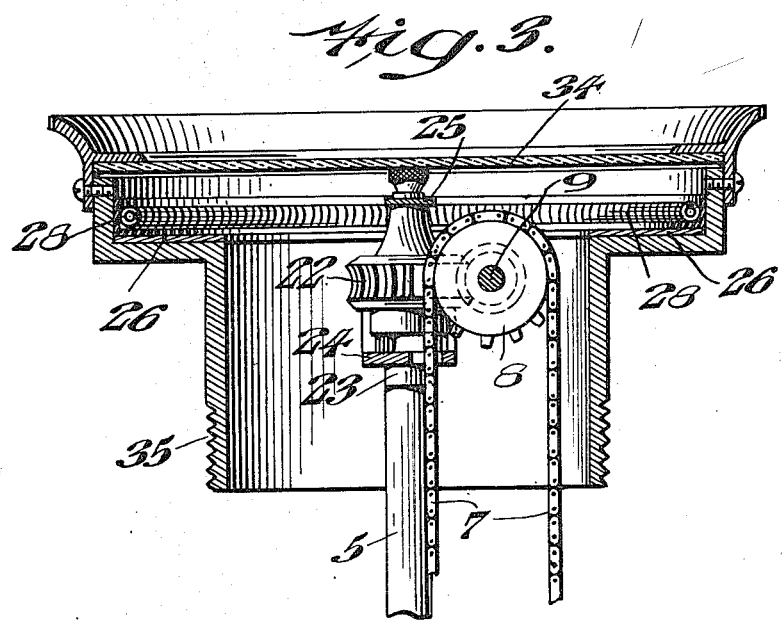
Figure 3 is a section on line 3—3 of Figure 2.
Figure 4:
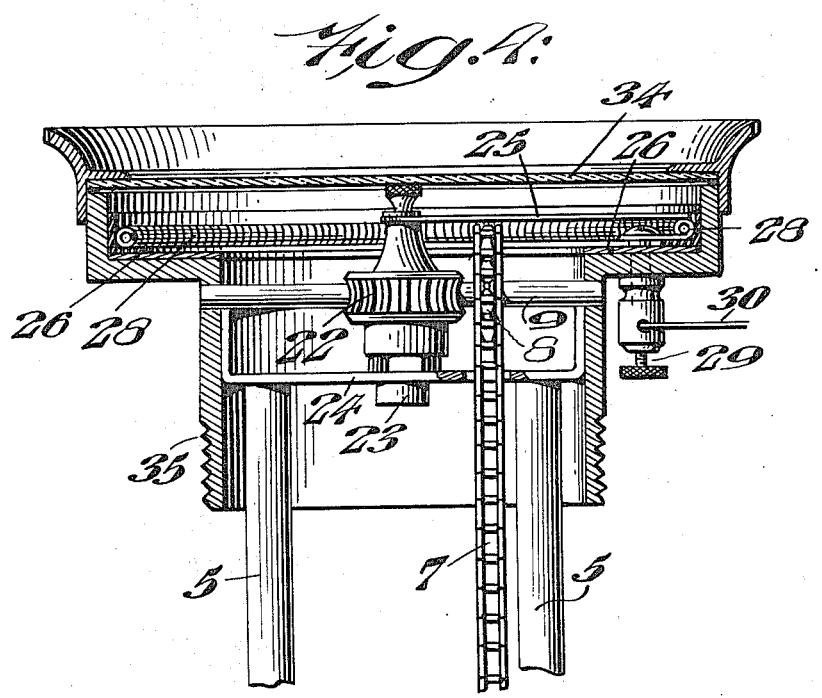
Figure 4 is a section on line 4—4 of Figure 2.

Referring to the drawings in which like reference characters indicate like parts, 1 designates a tank having the liquid 2 therein and the upper neck or opening 3 in which is fitted the casing 4. The casing 4 is carried at the top of a pair of rods 5 which carry at their bottom end a sprocket 6, over which travels the endless chain 7 which also travels over the upper roller 8 on the shaft 9 suitably journaled in the casing 4. The chain 7 may be provided with a spring 10, if desired, for tensioning purposes. The chain also carries a float made of the sections 13 and 14 which are hinged together so as to be foldable against each other and which are pivoted to the chain 7 at 16, so that the chain may be rotated on this pivot into the position shown in dotted lines in Figure 1 to permit of insertion of said float with the rods 5 through the narrow opening 3. In order to prevent the sections 13 and 14 from collapsing under normal conditions, the same are held together by the tap or stitch 18, best seen in Figure 1. The shaft 9 carrying the sprocket 8 also carries the worm 20 which is in mesh with the gear 22 on the shaft 23 journaled in the bracket 24, which shaft carries the pointer 25 which coacts with the graduated scale 26. The pointer 25 also has a wiping action with respect to the resistance element 28 which is connected by any suitable means to a source of electrical energy and which is provided with the external binding posts 29 to which are connected electrical wires 30 controlled by the switch 31, if desired, and which are connected to the electric gauge 32. The casing 4 is provided with any suitable transparent cover 34, through which the graduated scale 26 and pointer 25 may be inspected.

The operation is as follows: When it is desired to apply my novel gauge to a tank 1, the float sections 13 and 14, held in rigid position by means of the tab 18, are pivoted into a vertical position parallel to the rods 5 and the chain 7, and the rods 5 and the chain 7, together with the float 13—14, are then inserted through the narrow opening 3 into which the casing 4, threaded at 35, is fitted. The float then assumes the horizontal position shown in Figure 1, and since it is carried by the chain 7, it tends to actuate the chain with the rise and fall of the level of the liquid tube in the tank 1. The graduated scale 26 is calibrated to the tank 1, so that the pointer 25 may point in terms of volumetric units or in terms of height of the liquid in the tank the amount of liquid therein. In addition to indicating the figures shown on the graduated scale 26, the pointer 25 also coacts with the resistance element 28 to increase or decrease the amount of electrical energy flowing therethrough according to the position of the pointer with respect to said resistance element, and the electrical gauge 32 which may be positioned at a point remote from the tank 1 then registers the amount of electrical energy passing through said resistance element and thus indicating the amount of liquid in the tank 1, said gauge being suitably calibrated for that purpose. When it is desired to remove the gauge from the tank 1, a slight impact of the float 13—14 against the upper edge of the tank 1 will serve to break the connecting tab 18 and thus permit the sections 13 and 14 of the float to collapse downwardly on the hinge 36, thus permitting the withdrawal of the otherwise transversely disposed float through the narrow opening 3 in the top of the tank. For subsequent insertion the connecting tab 18, which was broken when the gauge was withdrawn from the tank, can be replaced.

Having thus described my invention, what I claim as new and desire to secure by Letters Patent is:

In a device of the character stated, a support, a housing at the top of said support, a sprocket at the bottom of said support, a shaft journaled in said housing, a sprocket on said shaft, an endless chain traveling over said sprockets, a worm on said shaft, a stub shaft in said housing, a gear fast on said stub shaft and engaging said worm, an indicator carried by said stub shaft, a graduated scale coacting with said indicator, a hinged, sectional float carried by said chain to actuate the latter and said indicator by the rise and fall of the liquid in a tank to which the device is applied, and means for normally retaining said hinged, sectional float in a rigid position.

THOMAS M. EYNON.